No. 705,726. Patented July 29, 1902.
J. C. WALLACE.
FILTER BED.
(Application filed May 5, 1902.)
(No Model.)
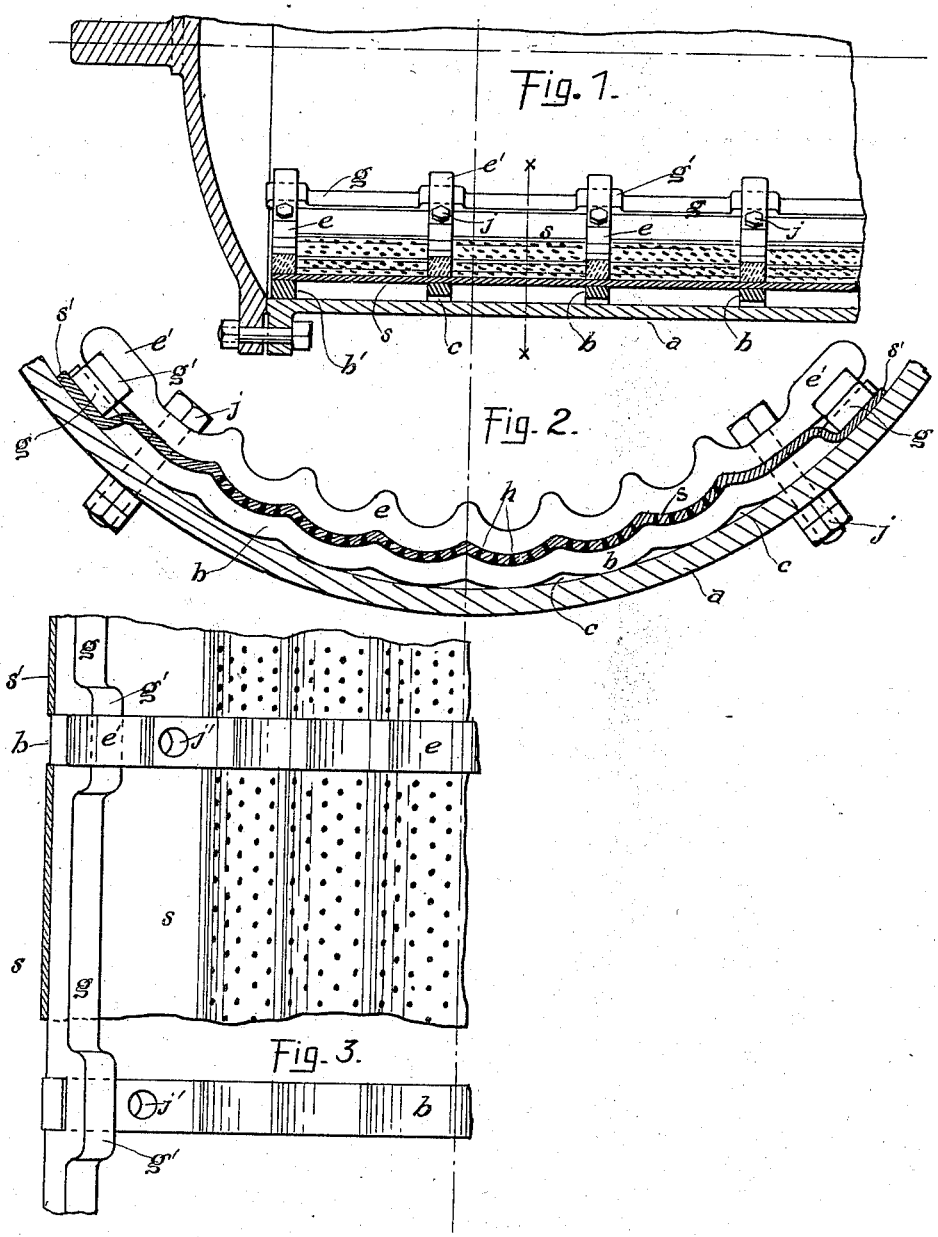
WITNESSES:
INVENTOR.
James C. Wallace
BY
ATTORNEY.

UNITED STATES PATENT OFFICE.

JAMES C. WALLACE, OF COLORADO CITY, COLORADO.

FILTER-BED.

SPECIFICATION forming part of Letters Patent No. 705,726, dated July 29, 1902.

Application filed May 5, 1902. Serial No. 105,977. (No model.)

*To all whom it may concern:*

Be it known that I, JAMES C. WALLACE, a citizen of the United States, residing at Colorado City, in the county of El Paso and State of Colorado, have invented a new and useful Improvement in Filter-Beds, of which the following is a specification.

My invention relates to filter-barrels such as are used in the chlorination process of extracting precious metals from pulverized ores, and has special reference to a filtering-bed within said barrel. I have described elsewhere (in Patent No. 653,631, dated July 10, 1900,) the general process of extracting the precious metal by a similar method, so that it need not be repeated here. All such filtering-barrels require within them a filtering surface or medium, practically separating the barrel into two generally unequal compartments, the larger one holding the ore, which is supported upon the upper surface of a filtering-bed, and the lower or smaller compartment holding the liquid solution which has drained through the filtering medium. It is the particular form, construction, and material of this filtering-bed which constitutes the subject-matter of my present invention and which I will now proceed to describe, reference being had to the accompanying drawings, in which—

Figure 1 represents a vertical longitudinal center section through the lower half of one end of a horizontal filter-barrel. Fig. 2 represents a cross-section, enlarged, through the lower arc of the barrel on a line $x\ x$ of Fig. 1. Fig. 3 is a plan view showing a portion of the filter as it would appear when looked down upon from above.

Identical letters represent identical parts wherever found.

My filter-bed consists of the following parts:

First. A filter sheet, blanket, or sieve (marked $s$ in the drawings) made of sheet-lead, perforated with numerous small drain-holes $h$, and corrugated longitudinally. This sheet follows the general curvature of the filter-barrel shell, lying about one or two inches off the inside of the shell on supports hereinafter to be described and extending longitudinally practically the length of the barrel. The two outside longitudinal edges of this filter-sheet $s$ are bent down and pressed in close contact against the barrel-shell, as $s'$.

Second. The filter-support consists of a series of long flat metal bars $b$, bent or formed to fit the corrugations of the filter-sheet $s$. These bars lie directly upon the interior of the barrel-shell laterally, and on them is placed the filter-sheet $s$. The bars being crimped or corrugated on their under surfaces also touch the shell only at their arching points (inverted) and along their outer ends, thus leaving open spaces $c$, through which the liquid solution may readily pass. The two end bars I prefer to make without these under corrugations, but have their under surfaces in direct contact throughout with the shell, as $b'$, Fig. 1, in order to prevent the liquid solution from entering under the filter at the ends of the barrel. I do not, however, limit myself to this particular device for closing up the ends of the filter, since any arrangement by which the liquid is excluded would serve equally well.

Third. Binding-strips $e$. These lie over the filter-supports $b$ and immediately upon the filter-sheet $s$, being formed to fit into the corrugations of the latter for the purpose of firmly holding or binding the filter-sheet in place. The two ends of the binding-strip are recessed in their lower faces to fit over and hold down the side binder-rails $g$.

Fourth. The side binder-rails $g$ extend longitudinally the whole length of the filter. Their purpose is to bind the two outer edges of the filter-sheet $s$ firmly down against the barrel-shell $a$. These side binder-rails are bridged at intervals, as $g'$, and recessed thereunder to receive the ends of the filter-supports $b$.

These several parts of the filter are all held together and firmly secured to the barrel-shell $a$ by means of the bolts $j$, which it will be seen pass down through the binding-strips $e$, the filter-sheet $s$, the filter-supports $b$, and the barrel-shell $a$, the bolt-holes being shown in Fig. 3 at $j'$.

All the parts of this filter-bed are of metal, thoroughly coated or covered with lead, except the filter-sheet, which is of sheet-lead.

It will be seen that the construction of my filter is very simple, having few parts easily joined together, and requires no burning or soldering to the barrel-shell, so that it may be quickly put in place or removed. This I claim to be a superiority over all other forms of lead filters now in use. Another superiority is in the corrugated form of the lead filter-sheet *s*, having the crowns of the corrugations concave instead of convex, since this form brings the small drain-holes *h* where they can most effectively filter the liquid solution and be better protected against the cutting action of small rock particles as the barrel rolls on its trunnions.

Having described my invention, what I claim as new and original is—

1. In a filter-bed a lead filter sheet, blanket or sieve formed in a series of corrugations with the crown of each corrugated arch inverted or dipping downward and having a number of small drain-holes perforated through the lower arcs of said corrugations.

2. In a filter-bed a series of metal lead-covered strips or bars bent or formed into lateral corrugations adapted to receive and support a filter sheet or blanket superimposed thereon.

3. In a filter-bed a series of metal lead-covered binding strips or bars having lateral corrugations adapted to fit over and upon a filter sheet or blanket, and having a portion of the under surfaces of each end channeled or recessed laterally to receive a perpendicularly-placed bar.

4. In a filter-bed a side binding strip or bar, having bridges at intervals and recessed thereunder to receive the ends of transverse bars.

5. In a filter-bed the combination of a corrugated filter sheet or blanket having numerous perforations through the lower arcs of said corrugations; a series of transverse supporting-bars formed to fit under and receive the corrugated contour of said filter-sheet; a series of superimposed binding strips or bars with transverse corrugations and slotted ends; two longitudinal side binding strips or bars; and bolts adapted to holding the several members together and in place within a filter barrel or tank.

JAMES C. WALLACE.

Witnesses:
CHARLES SCHLEGEL,
O. W. FAIRCHILD.